United States Patent
Clark et al.

(10) Patent No.: US 6,230,570 B1
(45) Date of Patent: *May 15, 2001

(54) TURBULENT SPOT FLOWMETER

(76) Inventors: John Paul Clark, 594 G East Center St., Manchester, CT (US) 06040; Terence V. Jones, Osney Lab, Dept. of Engineering Science, Parks Road, Oxford University, Oxford 1 3PJ (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,088

(22) Filed: Aug. 26, 1998

Related U.S. Application Data

(60) Provisional application No. 60/057,346, filed on Aug. 26, 1997.

(51) Int. Cl.[7] .................................................. G01F 1/712
(52) U.S. Cl. .......................................................... 73/861.06
(58) Field of Search ........................... 73/861.06, 861.95, 73/861.05, 861.04, 204.11, 204.14, 204.21–204.27, 861.18, 861.22, 861.21, 170.11, 170.12, 170.13, 170.14, 170.15

(56) References Cited

U.S. PATENT DOCUMENTS

| | | |
|---|---|---|
| 3,995,481 | 12/1976 | Djouup . |
| 4,070,908 | 1/1978 | Newell . |
| 4,297,898 * | 11/1981 | Herzl ................................ 73/861.22 |
| 4,637,253 | 1/1987 | Sekimura et al. . |
| 4,713,970 * | 12/1987 | Lambert ............................ 73/861.05 |
| 4,770,035 * | 9/1988 | Kolkebeck et al. .............. 73/861.22 |
| 4,920,793 | 5/1990 | Djorup . |
| 5,022,274 * | 6/1991 | Klinzing et al. .................. 73/861.05 |
| 5,218,863 * | 6/1993 | Mangalam ........................ 73/204.11 |
| 5,311,775 | 5/1994 | Suski et al. . |
| 5,357,795 | 10/1994 | Djorup . |
| 5,493,906 * | 2/1996 | Sen-Zhi ............................. 73/204.14 |
| 5,520,047 | 5/1996 | Tajagasgu et al. . |
| 5,533,412 * | 7/1996 | Jerman et al. .................... 73/861.95 |
| 5,585,557 * | 12/1996 | Loschke et al. .................. 73/170.14 |
| 5,639,964 | 6/1997 | Djorup . |
| 5,677,484 | 10/1997 | Stark . |
| 5,719,341 * | 2/1998 | Reynolds et al. ................. 73/861.95 |
| 5,741,979 * | 4/1998 | Arndt et al. ...................... 73/861.05 |

OTHER PUBLICATIONS

Clark, J.P., T.V. Jones and J.E. LaGraff, "On the Propagation of Naturally–Occuring Turbulent Spots", *Journal of Engineering Mathematics* vol. 28, 1994, pp. 1–19.

* cited by examiner

*Primary Examiner*—Max Noori
*Assistant Examiner*—Jagdish Patel
(74) *Attorney, Agent, or Firm*—Jeffrey D. Myers; Deborah A. Peacock

(57) ABSTRACT

A flowmeter and flow measurement method employing the determination of convection speed of turbulent spots. A plurality of sensors is employed, preferably thin-film gauges operating in constant temperature, constant current, or constant voltage mode. Airspeed (or fluid speed) is determined from the convection speed, preferably via dividing the streamwise sensor spacing by the product of the time lag to the peak of a crosscorrelation function and a calibration constant. Turbulence may be artificially induced, such as by intermittent jets, electrical sparks, or protuberances.

22 Claims, 5 Drawing Sheets

AIRCRAFT SURFACE

FLUID PROBE SURFACE

PIPE SURFACE

THE WHITE DOT INDICATES THE POSITIONING OF THE BELOW CONFIGURATION ON POTENTIAL EMBODIMENTS OF THE INVENTION

DETAILED CONFIGURATION

TURBULENT SPOT FLOWMETER

CROSS-REFERENCE TO RELATED APPLICATIONS

This application claims the benefit of the filing of U.S. Provisional Patent Application Serial No. 60/057,346, entitled Velocity Indicator, filed on Aug. 26, 1997, and the specification thereof is incorporated herein by reference.

BACKGROUND OF THE INVENTION

1. Field of the Invention (Technical Field)

The present invention relates generally to devices for the measurement of airspeed and fluid flow rates. Specifically, the invention is of a non-intrusive velocity indicator intended for surfaces over which a boundary layer undergoes transition to turbulence, either naturally or through input disturbances.

2. Background Art

Accurate airspeed measurements are essential to safe operations of jet aircraft. Typically, airspeed is inferred from a differential pressure measurement made with a pitot-static tube. Critical to the proper usage of a pitot-static tube is an estimate of the density of air in the vicinity of the tube. As such, a pitot-static tube must be calibrated for altitude (or corrected by the pilot in the case of general aviation aircraft) as well as Mach number in high-speed flight. The present invention concerns a device for which no density corrections need be applied.

Other prior art devices have been proposed for airspeed measurements. Many rely on various embodiments of a classical thermal anemometry system. These include those described in U.S. Pat. Nos. 4,920,793, 3,995,481, 5,357,795, and 5,639,964, to Djorup, U.S. Pat. No. 4,637,253, to Sekimura et al., U.S. Pat. No. 4,070,908, to Newell, U.S. Pat. No. 5,677,484, to Stark, and U.S. Pat. No. 5,311,775, to Suski et al. Such devices rely on the physical principle that the amount of heat dissipated from a heated element exposed to a moving stream is some function of the freestream speed. U.S. Pat. No. 5,357,795, to Djorup, also employs a vortex-shedding flowmeter in addition to a thermal anemometry system. Such a flowmeter relies on another well-known physical mechanism, namely that over some range of incident flow speeds, a circular cylinder will shed vortices at a frequency which is a unique function of the incident flow speed. However, Djorup appears to use vortex shedding as a simple indicator of flow direction. That is, the sensors which detect vortex shedding frequency must be located in the actual flowstream, while those at other circumferential locations around the axis of the device may or may not be. U.S. Pat. No. 5,639,964, to Djorup, discloses a pair of sensors offset along the major axis of an aircraft and speaks of crosscorrelating the signals from the sensors in order to estimate the likelihood of the aircraft experiencing large scale (i.e. aircraft sized turbulence).

U.S. Pat. No. 5,520,047, to Takahashi, is based on the principle that the heat-flux distribution along a flat plane incident to a moving stream is an indicator of air speed.

While the prior does employ a global measurement of the heat flux distribution over a surface as an indicator of flow speed, the present invention does so by making use of a measurement of the convection speed of turbulent spots as an indicator of flow speed. The present invention is unique in that it directly measures the velocity of events occurring in the flow and uses a simple calibration to infer the true airspeed.

SUMMARY OF THE INVENTION (DISCLOSURE OF THE INVENTION)

The present invention is of a flowmeter and flow measurement method employing the determination of convection speed of turbulent spots. In the preferred embodiment, a plurality of sensors is employed, preferably thin-film gauges operating in constant temperature, constant current, or constant voltage mode. Analog-to-digital conversion and digital signal processing is employed, particularly for cross-correlating signals from a plurality of sensors and conditioning the signals to enhance detection of turbulent spot interfaces. Airspeed is determined from the convection speed, preferably via dividing the streamwise sensor spacing by the product of the time lag to the peak of the crosscorrelation function and a calibration constant. It is first preferred to perform a calibration between the time lag to the peak of the crosscorrelation function and the average airspeed over a plurality of sensors for a particular application. Turbulence may be artificially induced, such as by intermittent jets, electrical sparks, or protuberances.

A primary object of the present invention is to provide an airspeed indicator useful for a variety of jet aircraft, including transonic stealth aircraft and general aviation aircraft.

A primary advantage of the present invention is that it is also useful for measuring flow through any conduit through which a fluid passes, including oil pipelines, municipal water systems, and HVAC systems.

Other advantages of the present invention include that it does not intrude upon the flow that it measures and that it needs no correction for changes in fluid density.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention is a non-intrusive flowmeter that can be fitted on any surface over which a boundary layer undergoes transition to turbulence, either naturally or through some input disturbance(s). The primary use of the invention is as an airspeed indicator, such as for transonic stealth aircraft or general aviation aircraft. It is also useful as a flowmeter for any conduit through which a fluid passes, such as oil pipelines, municipal water systems, and HVAC systems. Although many flowmeters exist today, none make use of the characteristics of turbulent-spot propagation to determine flow speed. Also, in the case of a general aviation aircraft, a pitot static tube is normally used to infer the airspeed from a differential pressure measurement. The inferred airspeed is dependent upon an assumption of the air density in the vicinity of the aircraft, and may thus be in error. The present invention gives a more direct measurement of airspeed independent of the altitude at which the aircraft flies. This is because the measurement is not altered by density changes which may arise from changes in altitude or aircraft speed.

When a boundary layer undergoes transition from the laminar to the fully-turbulent state, spots of turbulence form and convect downstream. Since the transport properties of laminar and turbulent flows are disparate, the passage of these so-called turbulent spots may be detected with a sensor that measures, either directly or indirectly, unsteady heat flux. The growth of turbulent spots under a variety of flow conditions, including both incompressible and transonic flow regimes, is discussed in Clark et al., "On the Propagation of Naturally-Occurring Turbulent Spots", J. Eng. Math. 28:1–(1994). When treated as single large eddies, turbulent spots convect downstream at a constant fraction of the local freestream speed which, in the case of constant velocity flow, is independent of the local Mach number. Under the influence of a pressure gradient, the spot eddy velocity is non-constant, but again is some function of the local freestream speed. Also, the upstream and downstream interfaces of the spots propagate at fractions of the local flow-speed. Various embodiments of the present invention take advantage of these physical principles.

Figure 1:
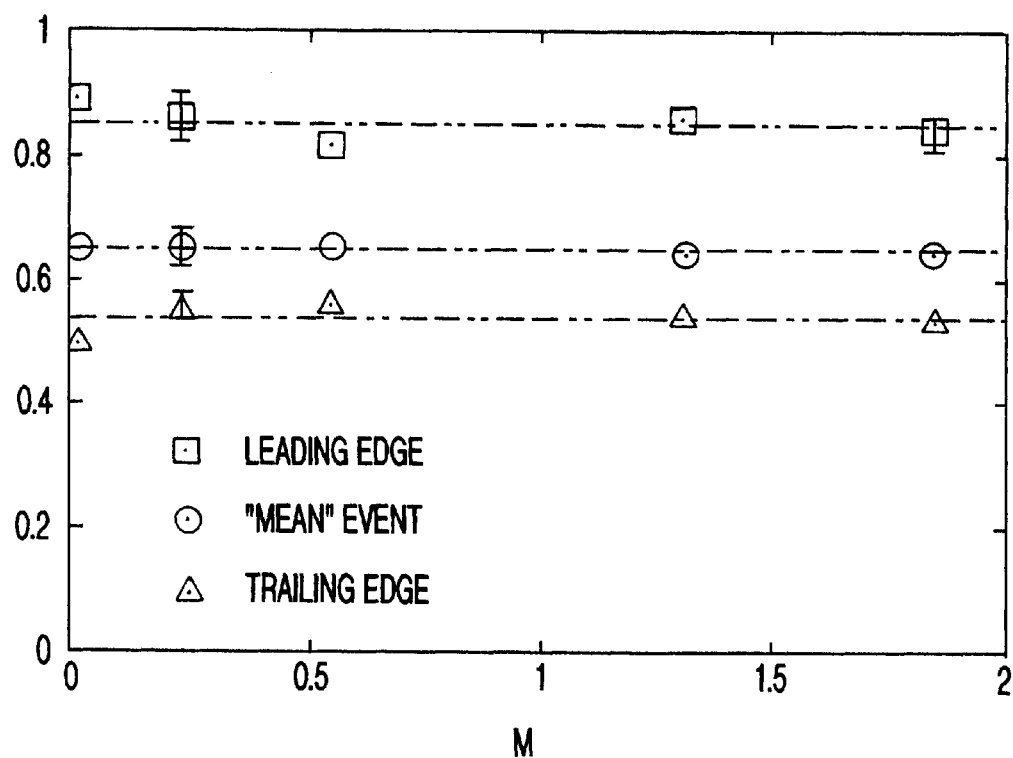
FIG. 1 is a graph of the variation of turbulent-spot fractional propagation rates with local Mach number.

Turbulent-spot trajectories along a flat plate were measured for both subsonic and supersonic constant-velocity flows. Over the range of conditions tested (Mach 0.24 to 1.86), the spot leading- and trailing-edge fractional propagation rates were independent of the local Mach number of the flow. The same was true of the spot event-velocity, or "mean" convection rate, when normalized by the local freestream velocity. FIG. 1 is a plot of the variations of leading-edge, trailing-edge, and "mean" fractional propagation rates with Mach number for the conditions tested. The uncertainties on the measurements are within the boundaries of the symbols used on the plot unless otherwise indicated with error bars. The incompressible values (e.g., at Mach ~0.02) plotted on FIG. 1 were previously known and accepted.

The present invention takes advantage of these findings by providing a non-intrusive airspeed indicator that capitalizes on the fluid dynamic effect outlined above, which indicator is robust, non-intrusive, and stealthy. The sensor of the device is preferably mounted flush with an aircraft surface, for example, and placed in a region over which a constant velocity flow of magnitude which is some function of the freestream speed obtains. The device preferably also includes two or more thin-film heat flux gauges offset in the streamwise direction and operated at constant temperature. An analog-to-digital (A/D) converter is preferably used in conjunction with a digital signal processor (DSP) (e.g., a general-purpose microprocessor or a custom DSP device) to crosscorrelate the signals. The airspeed is related to the time lag to the peak of the crosscorrelation function, $\Delta t_p$, via the equation:

$$U_\infty = \frac{\Delta x}{C_s \Delta t_p},$$

where $\Delta x$ is the streamwise spacing between thin films and $C_s$ is the known fractional propagation rate for the spot eddy, which is 0.65 in the example that follows.

Figure 2:
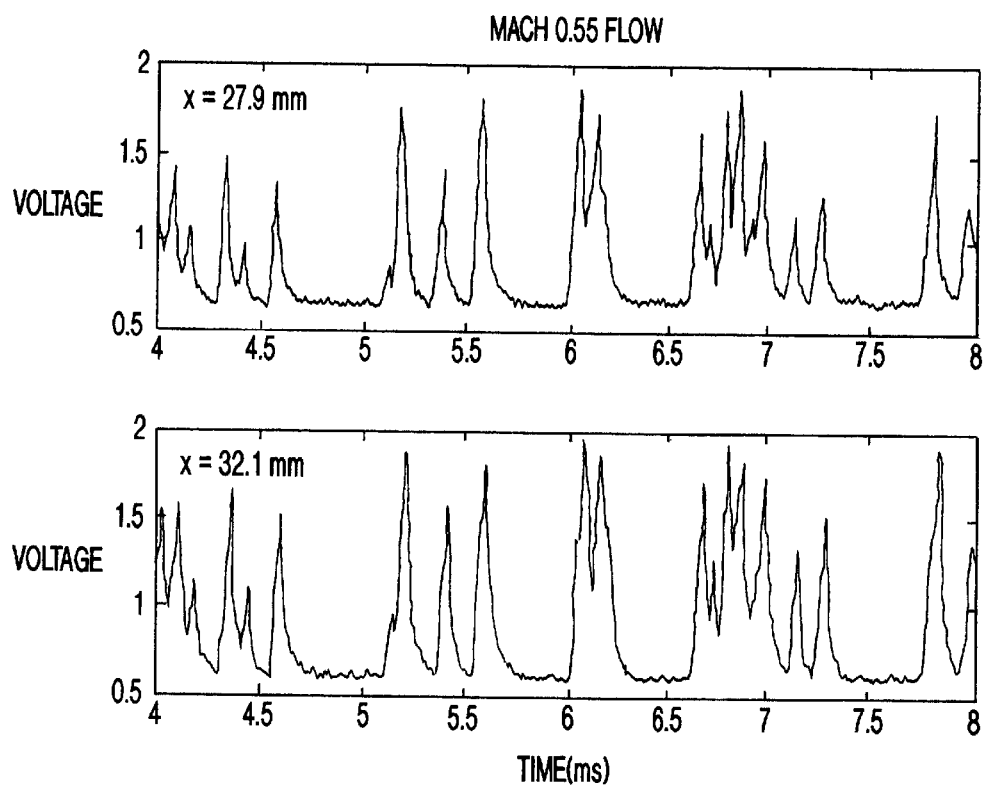
FIG. 2 is a pair of graphs showing unsteady voltage traces from a pair of thin-film heat-flux gages offset a distance $\Delta x=4.2$ mm in the streamwise direction.
Figure 3:
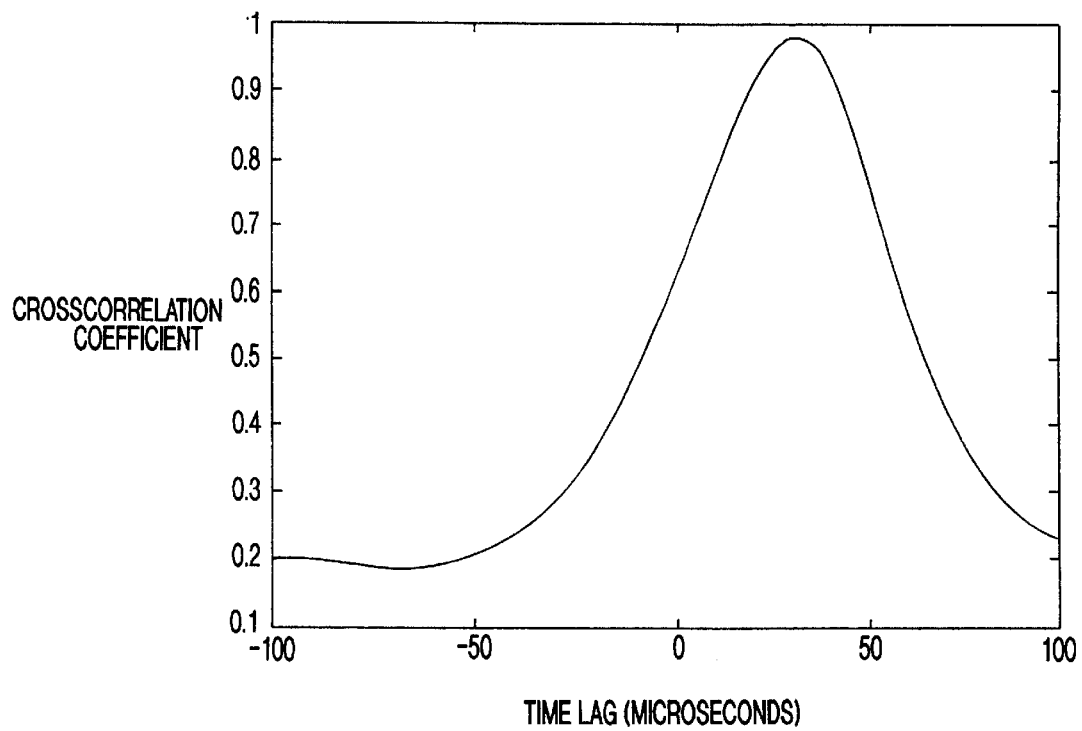
FIG. 3 is a graph of a crosscorrelation analysis performed on the unsteady voltage traces of FIG. 2.

As an example of the performance of the present invention, FIG. 2 is a plot of a pair of voltage traces from heat-flux gauges offset in the streamwise direction by a distance $\Delta x$=4.2 mm. The gauges were immersed in a flow with a measured Mach number of 0.55 and a total temperature of 410° K. In FIG. 3, the results of a crosscorrelation analysis performed on the traces of FIG. 2 is presented. There is a pronounced peak in the crosscorrelation function with a very high degree of correlation (0.98) at $\Delta t_p$=29 $\mu$s. At the conditions of the experiment, the application of the above equation gives a freestream velocity of 223 m/s. This is within 3% of the value determined via compressible flow theory (i.e., 217 m/s).

As may be readily inferred from the results presented in FIGS. 1 and 2, alternate means of signal conditioning may be employed to determine the convection rate of the spot leading- and/or trailing-interfaces. If so employed, the airspeed may be determined through a simple change in the calibration constant, $C_s$. In addition, if the flow speed between the thin film gauges is itself non-constant (i.e., if a pressure gradient obtains), the device of the invention may still be employed. The device must simply be calibrated against some standard. The device is not limited to the specific mode of operation presented in the foregoing example. A principal point is that mathematical relationships exist between the representative convection speeds of turbulent spots (FIG. 1) and the magnitude of the mainstream velocity. The specific relationship employed and the exact means of exploiting to determine flowspeed are straightforward design and calibration issues.

The unsteady heat-flux traces in FIG. 2 were obtained in a transonic transient wind tunnel. The gauges were operated in a constant current mode and the signals were processed through analogues of the 1-D unsteady heat-conduction equation. The sensors had a bandwidth of about 100 kHz, but required a temperature difference between the fluid and the surface of interest (i.e., the substrate) to operate.

Figure 4:
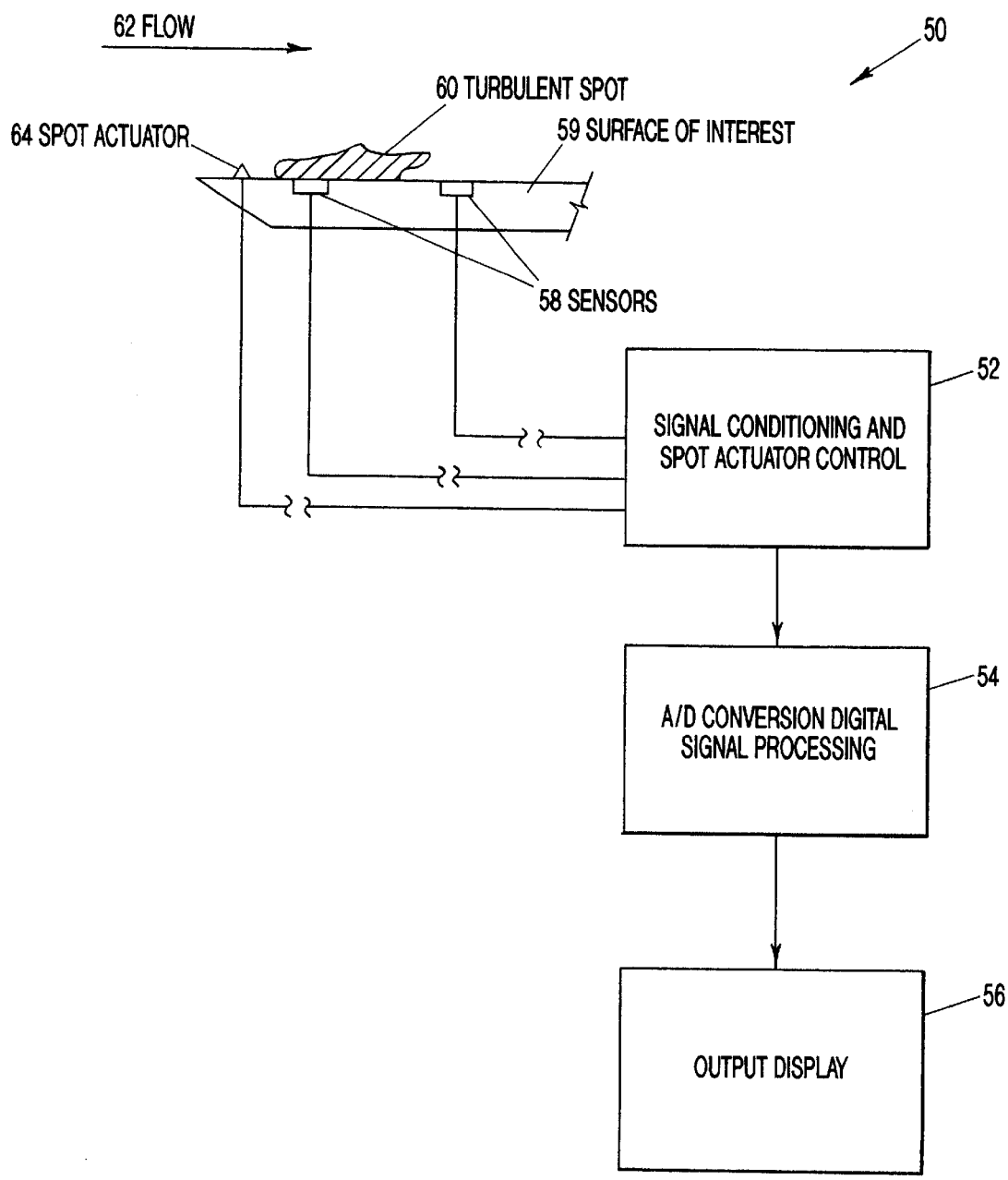
FIG. 4 is a schematic diagram of the turbulent spot flowmeter of the invention.
Figure 6:
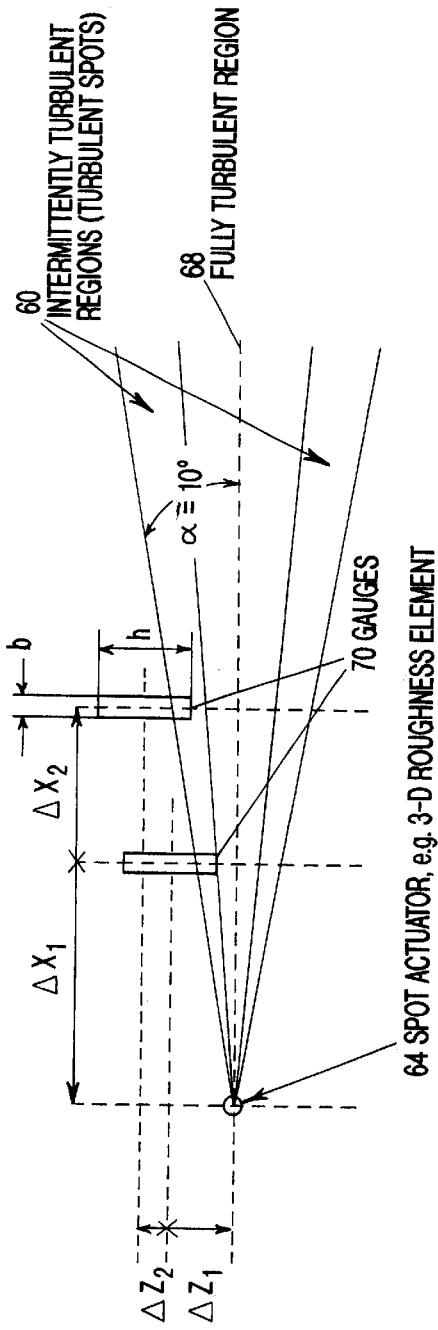
FIG. 6 illustrates an embodiment of the invention using artificially generated turbulent spots.

For the flowmeter 50 of the invention to be useful in flight to measure the speed of a flow 62, thin films operated at constant temperature are preferably employed although constant current and constant voltage operation are both feasible. The choice must be made as a design decision. When operated at constant temperature, the bandwidth of the thin-film gauges or sensors 58 is limited to about 20 kHz by the thermal response of the substrate 59 on which the sensors are mounted. The bandwidth of the instrument may be increased by using a frequency-dependent amplifier (not shown). In addition, a facility or spot actuator 64 for artificially triggering turbulent spots 60 is preferably employed although it may not always be needed. This is again a design issue. This may be an intermittent jet, electrical spark, protuberance, or the like. Bridge circuitry 52 with required bandwidth, A/D converters and DSP units 54, and output display 56 are also preferred, as shown in FIG. 4.

Where turbulent spots are artificially generated by a 3-D roughness element or spot actuator (e.g., a hemispherical protuberance), as shown in FIG. 6, a fully turbulent region 68 as well as an intermittently turbulent region composed of turbulent spots 60 is generated. Gauges are preferably placed as shown with geometric parameters determined as a result of a design study. The spots are generated continually by the roughness, and their propagation rate is measured as before.

Figure 5A:
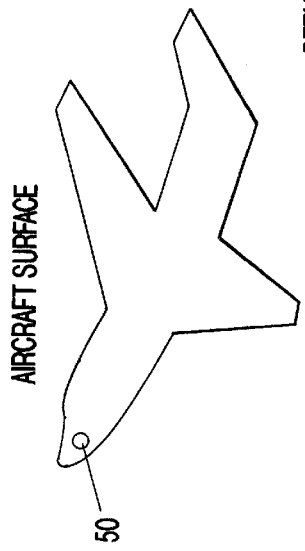
FIGS. 5(a)–(c) illustrate placement of the flowmeter of the invention on surfaces of interest.
Figure 5B:
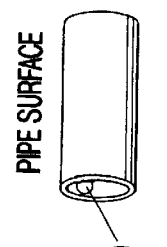
Figure 5C:
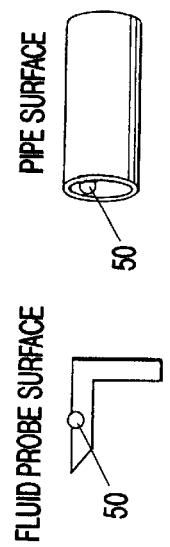

The present invention is a robust, non-intrusive, and stealthy instrument for vehicles operating in the transonic regime and in other applications. FIGS. 5(a)–(c) illustrate placement of the invention 50 on an aircraft surface, fluid probe surface, and pipe surface, respectively. Because stealth is not required for general aviation aircraft, the sensors of the invention may be mounted on a flat plate probe and inserted into the freestream in the same way that ptot static tubes are used today. For flow velocities in pipes and ductwork, the invention may also be employed because turbulent slugs occurring in such flows exhibit many of the same characteristics as do turbulent spots in external flows.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A flowmeter comprising: an actuator generating turbulent spots traveling proximate a surface, a plurality of sensors along the surface and downstream from said actuator, each of said sensors detecting said turbulent spots at a different distance from said actuator, and signal processing means connected to said sensors for determining streamwise propagation speed of said turbulent spots detected by said plurality of sensors, wherein each of said turbulent spots comprises a finite region of self-sustaining turbulence that propagates both across and in a direction of fluid flow in a boundary layer undergoing transition to turbulence.

2. The flowmeter of claim 1, wherein said sensors comprise thin-film gauges operating in a mode selected from the group consisting of constant temperature, constant current, and constant voltage.

3. The flowmeter of claim 1, wherein said signal processing means comprises an analog-to-digital converter.

4. The flowmeter of claim 1, wherein said signal processing means comprises a digital signal processor.

5. The flowmeter of claim 4, wherein said digital signal processor is crosscorrelating signals from said plurality of sensors.

6. The flowmeter of claim 5, wherein said digital signal processor conditions said signals to enhance detection of turbulent spot interfaces.

7. The flowmeter of claim 1, wherein said signal processing means determines an airspeed from said streamwise propogation speed.

8. The flowmeter of claim 7, wherein said signal processing means divides a streamwise sensor spacing by a product of a time lag to a peak of a crosscorrelation function and a calibration constant to determine the airspeed.

9. The flowmeter of claim 7, wherein said signal processing means performs a calibration between a time lag to a peak of a crosscorrelation function and an average airspeed over said plurality of sensors.

10. The flowmeter of claim 1, wherein said actuator is artificially inducing boundary-layer transition to turbulence.

11. The flowmeter of claim 10, wherein said actuator is selected from the group consisting of intermittent jets, electrical sparks, and protuberances.

12. A flow measurement method comprising the steps of: generating with an actuator turbulent spots traveling proximate a surface, sensing the turbulent spots with a plurality of sensors along the surface and downstream from the actuator, and determining by signal processing streamwise propagation speed of the turbulent spots, wherein each of the generated turbulent spots is a finite region of self-sustaining turbulence propagating both across and in a direction of fluid flow in a boundary layer undergoing transition to turbulence.

13. The flow measurement method of claim 12, wherein the sensing step comprises sensing with thin-film gauges operating in a mode selected from the group consisting of constant temperature, constant current, and constant voltage.

14. The flow measurement method of claim 12, wherein the determining step comprises the step of performing analog-to-digital conversion.

15. The flow measurement method of claim 12, wherein the determining step comprises the step of performing digital signal processing.

16. The flow measurement method of claim 15, wherein the performing step comprises crosscorrelating signals from the plurality of sensors.

17. The flow measurement method of claim 16, wherein the performing step additionally comprises conditioning the signals to enhance detection of turbulent spot interfaces.

18. The flow measurement method of claim 12, additionally comprising the step of determining an airspeed from the streamwise propagation speed.

19. The flow measurement method of claim 18, wherein the determining step comprises the step of dividing a streamwise sensor spacing by a product of a time lag to a peak of a crosscorrelation function and a calibration constant.

20. The flow measurement method of claim 18, wherein the determining step comprises performing a calibration between a time lag to a peak of a crosscorrelation function and an average airspeed over the plurality of sensors.

21. The flow measurement method of claim 12, wherein the generating step comprises artificially inducing boundary-layer transition to turbulence.

22. The flow measurement method of claim 21, wherein the step of artificially inducing boundary-layer transition comprises the step of employing a means selected from the group consisting of intermittent jets, electrical sparks, and protuberances.

* * * * *